Figure 1:
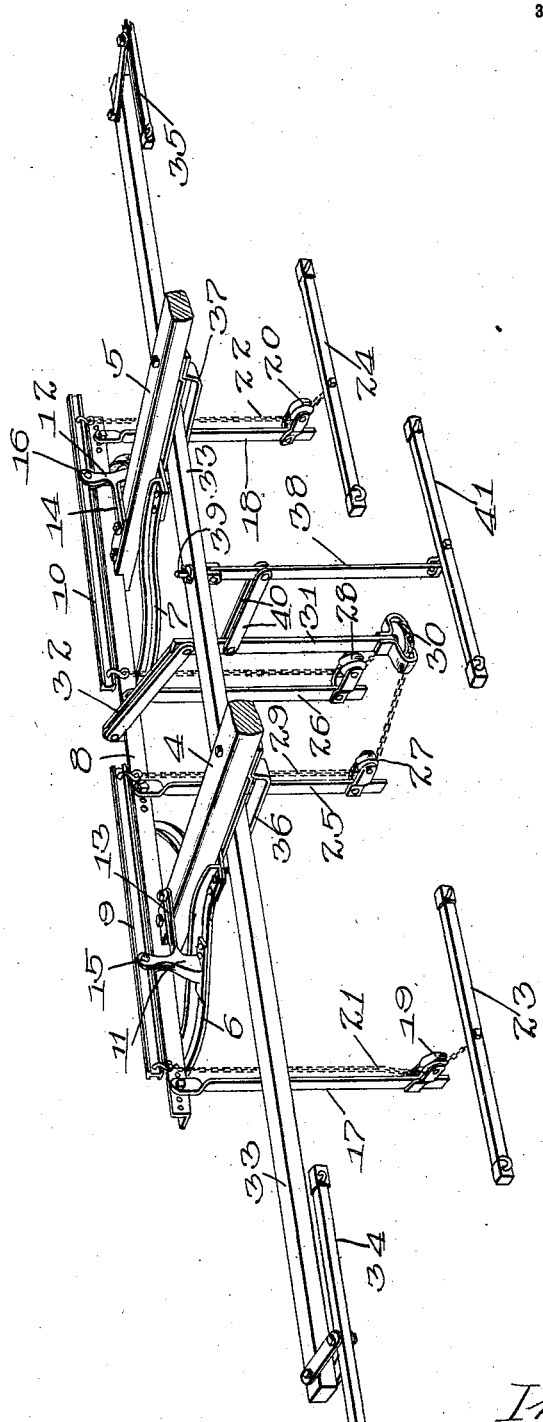

W. A. PAUL.
EVENER.
APPLICATION FILED OCT. 16, 1907.

937,853.

Patented Oct. 26, 1909.
3 SHEETS—SHEET 1.

Witnesses:
G. V. Domarus Jr.
Robert H. Weir

Inventor:
Wesley A. Paul,
by Bond Adams Pickard & Jackson
his Attys.

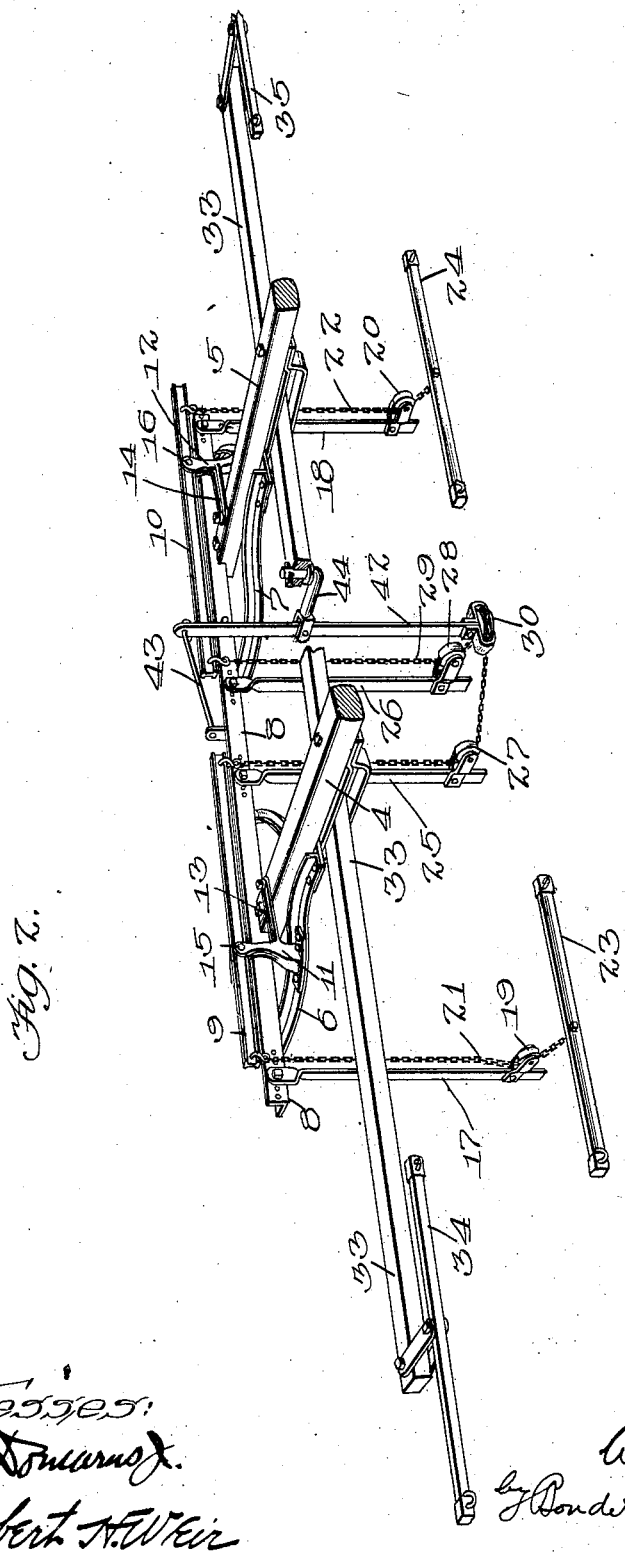

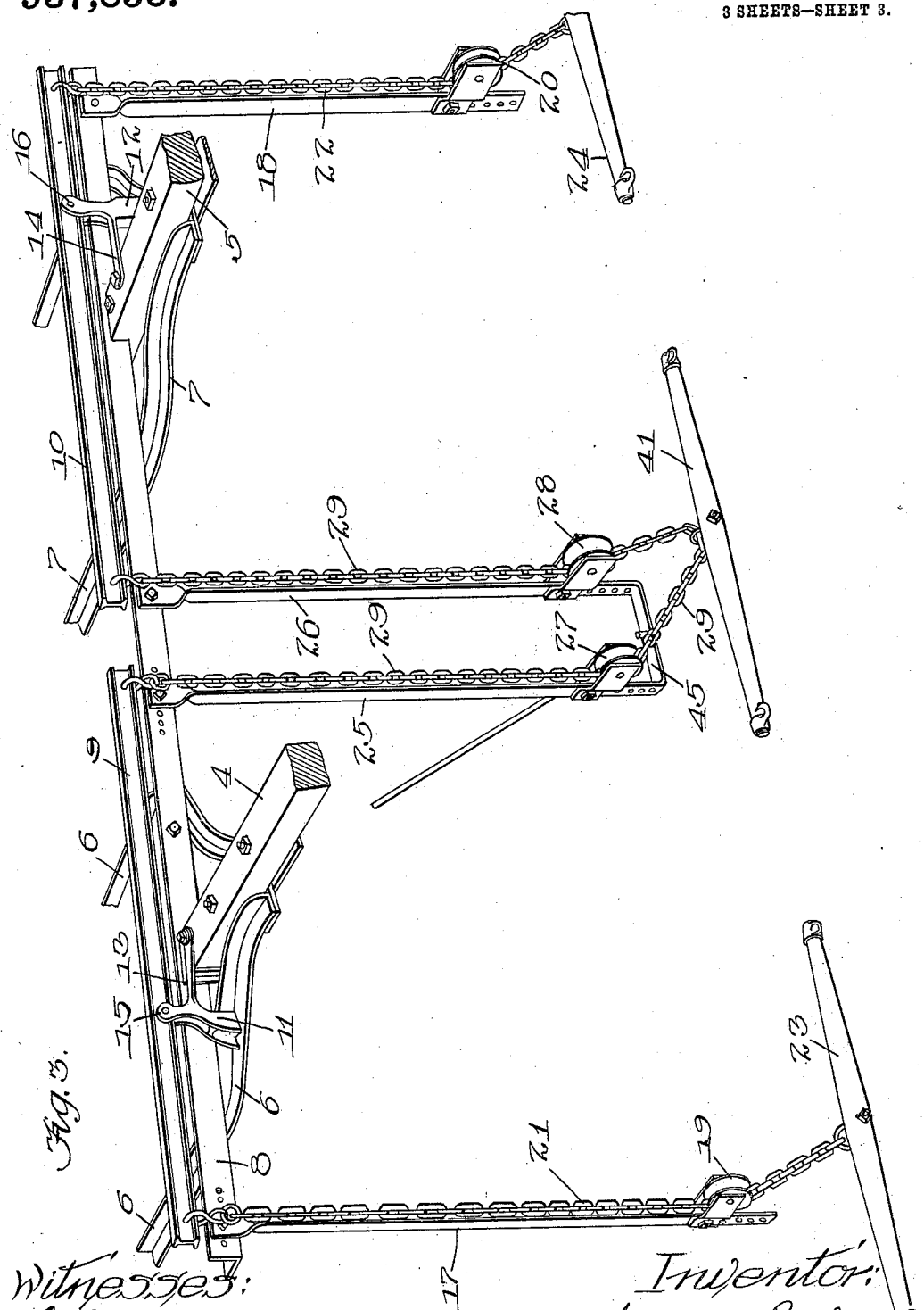

UNITED STATES PATENT OFFICE.

WESLEY A. PAUL, OF PERU, ILLINOIS, ASSIGNOR TO DAVID BRADLEY MANUFACTURING COMPANY, OF BRADLEY, ILLINOIS, A CORPORATION OF ILLINOIS.

EVENER.

937,853.   Specification of Letters Patent.   Patented Oct. 26, 1909.

Application filed October 16, 1907. Serial No. 397,747.

*To all whom it may concern:*

Be it known that I, WESLEY A. PAUL, a citizen of the United States, residing at Peru, in the county of Lasalle and State of Illinois, have invented certain new and useful Improvements in Eveners, of which the following is a specification, reference being had to the accompanying drawings.

My invention relates to eveners for agricultural implements, such as cultivators, and has for its object to provide a new and improved evener which may be readily adapted for three, four or five horses. I accomplish this object as illustrated in the drawings and as hereinafter described.

That which I believe to be new is set forth in the claims.

In the accompanying drawings,—Figure 1 is a perspective view illustrating my improved evener as arranged for a five-horse team; Fig. 2 illustrates the arrangement used for a four-horse team; and Fig. 3 the arrangement for a three-horse team.

Referring to the drawings,—4—5 indicate tongues or poles spaced a distance apart and extending forward from the forward portions 6—7 of the frame of the machine. Said tongues are similar to the ordinary cultivator tongue, but are set far enough apart so that a horse may be placed between them. They are rigidly connected to the frames 6—7 in any suitable way.

8 indicates a crossbar connecting the rear end-portions of the tongues and secured fixedly to the frame of the machine. Said crossbar serves to support certain parts of the evener, as will hereinafter appear.

9—10 indicate equalizer-bars fulcrumed between their ends upon suitable supports 11—12, respectively, which are fixedly secured to the members 6—7 of the frame and are preferably braced from the rear ends of the tongues by straps 13—14, respectively, as shown in Fig. 1. 15—16 indicate the pivots or fulcra of said bars which, as shown in Fig. 1, are placed nearer the outer than the inner ends of said bars,—in the construction shown said fulcra being placed twice as far from the inner ends of their respective bars as from the outer ends thereof.

17—18 indicate straps which depend from the ends of the crossbar 8 and carry sheaves 19—20, respectively, as shown in Fig. 1.

21—22 indicate chains connected at their upper ends to the outer ends of the equalizer-bars 9—10, respectively, and passing down around the sheaves 19—20 to swingle-trees 23—24 to which they are respectively connected. Thus the draft of the horses secured to the swingle-trees 23—24 serves to pull down on the outer ends of the equalizer-bars 9—10.

25—26 indicate straps, which depend from the inner portion of the crossbar 8 at opposite sides of the center thereof and carry sheaves 27—28, respectively.

29 indicates a chain, the ends of which are secured to the inner ends of the equalizer-bars 9—10, said chain passing down around the sheaves 27—28 and having its intermediate portion extended around a sheave 30 carried at the lower end of a strap 31 suspended from the central portion of the crossbar 8 by one or more straps 32, as shown in Fig. 1. Straps 32 extend forward from the crossbar 8, so that the strap 31 is carried in advance of the sheaves 27—28.

33 indicates a long equalizer in the form of a bar, which carries swingle-trees 34—35 at its ends, said equalizer being of such length that the swingle-trees 34—35 are carried outside of the swingle-trees 23—24, as shown in Fig. 1. The equalizer 33 is carried under the poles 4—5, being supported by straps 36—37, which are secured to the under sides of said poles so that they support said equalizer but permit a limited amount of forward and backward movement thereof.

38 indicates a strap, which at its upper end is pivotally connected with the center of the equalizer 33, as shown at 39 in Fig. 1 and extends downward in front of the strap 31, to which it is connected by one or more straps 40, as also shown in Fig. 1. The straps 40 are connected with the straps 31 and 38 near the upper ends thereof.

41 indicates a swingle-tree carried at the lower end of the strap 38.

From the foregoing description it will be seen that the outermost horses, which are connected to the swingle-trees 34—35, draw directly upon the outer ends of the equalizer 33 and that their draft is transmitted through straps 38, 40 and 31 to the chain 29. The center horse, which is placed between the poles 4—5, draws upon the swingle-tree 41, the draft being also transmitted through links 40 and strap 31 to the chain 29 and thence to the inner ends of the equalizer-bars 9—10. The intermediate horses, which are hitched to the swingle-trees 23—24, draw upon the outer ends of the equalizer-bars 9—10 through chains 21—22, respectively. The fulcra of the several bars are so placed that the draft of the two horses connected with the outer ends of the equalizer-bars 9—10 balances that of the single horse connected with the swingle-tree 41 and the two outside horses connected with the swingle-trees 34—35.

The four-horse arrangement illustrated in Fig. 2 is very similar to that already described,—the difference being that the straps 38 and 40 and swingle-tree 41 are omitted and instead of the strap 31 a similar strap 42 is employed connected at its upper end with the crossbar 8 by a rod, or other connection, 43 and pivotally connected centrally with the equalizer-bar 33 by an arm 44, as shown in Fig. 2. Except for the fact that the center horse is not used, the construction and arrangement are otherwise the same as that shown in Fig. 1.

For use with three horses, as shown in Fig. 3, the long equalizer-bar 33 is omitted and also the strap 42 and connection 43 of the four-horse arrangement,—the swingle-tree 41 being in this case connected directly to the chain 29. The draft of the center horse is therefore transmitted directly to the inner ends of the equalizer-bars 9—10 and works against the draft of the outer horses connected to the swingle-trees 23—24. The lower ends of the straps 25—26 in this arrangement are connected together by a strap 45 so as to hold the sheaves 27—28 properly apart.

It will be seen from the foregoing description that my improved evener may be readily arranged for three, four or five horses.

That which I claim as my invention, and desire to secure by Letters Patent, is,—

1. The combination of a machine frame, a transversely-extending equalizer-bar, draft devices connected with the end portions thereof, a pair of equalizer-bars extending transversely of the machine frame and fulcrumed thereupon between their ends, a flexible connection connecting the inner end portions of the latter equalizer-bars, flexible connections connected to the outer ends of the latter equalizer-bars and having means independent of said first-mentioned equalizer-bar for attachment to draft animals, sheaves around which the several flexible connections pass, and means including a draft device, connecting said first-mentioned equalizer-bar with the flexible connection connected to the inner end portions of the other equalizer-bars.

2. The combination of a machine frame, a pair of equalizer-bars extending transversely thereof and fulcrumed thereupon between their ends, a flexible connection connected to the inner end-portions of said equalizer-bars and having means for connection to a draft animal, flexible connections connected to the outer ends of said equalizer-bars and having means for attachment to a draft animal, sheaves around which the several flexible connections pass, depending straps by which said sheaves are carried, a transversely-extending equalizer-bar, and draft devices connected with the outer end-portions thereof, said equalizer-bar being connected with said first-mentioned flexible connection.

3. The combination of a machine frame, transversely-disposed equalizer-bars fulcrumed upon the frame to swing in a vertical plane, draft devices connected by flexible connections with the outer end portions of said equalizer-bars, a draft device connected by a flexible connection and lever mechanism with the inner end portions of said equalizer-bars, and sheaves for guiding said flexible connections.

4. The combination of a machine frame, transversely-disposed equalizer-bars fulcrumed upon the frame to swing in a vertical plane, draft devices connected by flexible connections with the outer end-portions of said equalizer-bars, a draft device connected by a flexible connection with the inner end-portions of said equalizer-bars, tongues extending forward from the machine frame, an equalizer-bar extending across and supported by said tongues, draft devices connected with the outer end-portions of the latter equalizer-bar, and means connecting the latter equalizer-bar with the flexible connection which is connected to the inner-end portions of said first-mentioned equalizer-bars.

5. The combination of a machine frame, tongues extending forward therefrom, short equalizer-bars mounted on the frame, draft devices connected with the outer end portions of said short equalizer-bars, a long equalizer-bar extending transversely of said tongues and supported thereby independently of said short equalizer-bars, draft devices connected with the outer end portions of said long equalizer-bar, and means connecting said long equalizer-bar intermediately with the inner end portions of said short equalizer-bars.

6. The combination of a machine frame, tongues extending forward therefrom, a long equalizer-bar extending transversely of said tongues and supported thereby, short equalizer-bars fulcrumed upon the frame to swing in a vertical plane, draft devices connected with the outer end-portions of said short equalizer-bars, draft devices connected with the outer end-portions of said long equalizer-bar, and means connecting said long equalizer-bar centrally with the inner end-portions of said short equalizer-bars.

7. The combination of a machine frame, tongues extending forward therefrom, a long equalizer-bar extending transversely of said tongues and supported thereby, short equalizer-bars fulcrumed upon the frame to swing in a vertical plane, draft devices connected with the outer end-portions of said short equalizer-bars, draft devices connected with the outer end-portions of said long equalizer-bar, a strap depending centrally from said long equalizer-bar, said strap being connected intermediately with the inner end portions of said short-equalizer-bars and with the machine frame, and a draft device at the lower end-portion of said strap.

8. The combination of a machine frame, tongues extending forward therefrom, a long equalizer-bar extending transversely of said tongues and supported thereby, short equalizer-bars fulcrumed upon the frame to swing in a vertical plane, draft devices connected with the outer end-portions of said short equalizer-bars, draft devices connected with the outer-end portions of said long equalizer-bar, a strap connected at its lower end with the inner end-portions of said short equalizer-bars and at its upper end with the machine frame, and means pivotally connecting said strap with said long equalizer-bar.

9. The combination of a machine frame, short equalizer-bars fulcrumed thereupon to swing in a vertical plane, tongues extending forward from the machine frame, a long equalizer-bar extending transversely of said tongues and supported thereby, draft devices connected with the outer end-portions of said long equalizer-bar, straps depending from the machine frame adjacent to the end-portions of said short equalizer-bars, sheaves carried by said straps, flexible connections connected with the outer end-portions of said short equalizer-bars and passing through the adjacent sheaves, draft devices connected with said flexible connections, a flexible connection connected with the inner end-portions of said short equalizer-bars and passing around the adjacent sheaves, a strap connected at its upper end with the machine frame and at its lower end having a sheave around which said last-mentioned flexible connection passes, and means connecting said last-mentioned strap with said long equalizer-bar.

10. The combination of a machine frame, short equalizer-bars fulcrumed thereupon to swing in a vertical plane, tongues extending forward from the machine frame, a long equalizer-bar extending transversely of said tongues and supported thereby, draft devices connected with the outer end-portions of said long equalizer-bar, straps depending from the machine frame adjacent to the end-portions of said short equalizer-bars, sheaves carried by said straps, flexible connections connected with the outer end-portions of said short equalizer - bars and passing through the adjacent sheaves, draft devices connected with said flexible connections, a flexible connection connected with the inner end-portions of said short equalizer-bars and passing around the adjacent sheaves, a strap connected at its upper end with the machine frame and at its lower end having a sheave around which said last-mentioned flexible connection passes, means connecting said last-mentioned strap with said long equalizer-bar, a strap connected at its upper end centrally with said long equalizer-bar and having a draft device at its lower end, and means connecting the last-mentioned straps so that draft applied to the last-mentioned draft device is transmitted to the inner ends of said short equalizer-bars.

WESLEY A. PAUL.

Witnesses:
T. W. KOEHLER,
CHAS. B. HOENSCHEID.